United States Patent
Bartels et al.

(10) Patent No.: US 7,769,547 B2
(45) Date of Patent: Aug. 3, 2010

(54) KARYOMETRY-BASED METHOD FOR PREDICTION OF CANCER EVENT RECURRENCE

(75) Inventors: Peter H. Bartels, Tucson, AZ (US); Rodolfo Montironi, Corinaldo (IT)

(73) Assignee: David S. Alberts, Tucson, AZ (US)

( * ) Notice: Subject to any disclaimer, the term of this patent is extended or adjusted under 35 U.S.C. 154(b) by 1102 days.

(21) Appl. No.: 11/264,207

(22) Filed: Nov. 1, 2005

(65) Prior Publication Data

US 2007/0100562 A1    May 3, 2007

(51) Int. Cl.
*G06F 19/00* (2006.01)
*G06K 9/00* (2006.01)
*G06K 9/20* (2006.01)
*G06K 9/36* (2006.01)

(52) U.S. Cl. .................. 702/19; 382/128; 382/133; 382/282; 382/286

(58) Field of Classification Search ............... None
See application file for complete search history.

(56) References Cited

U.S. PATENT DOCUMENTS 7,343,033 B2 * 3/2008 Bartels .................. 382/133

FOREIGN PATENT DOCUMENTS

WO   WO 2005/043121   *   5/2005

OTHER PUBLICATIONS

Van Velthoven et al., Identificaton by Quantitative Chromantin Pattern Analysis of Patients . . . Bladder Carcinoma, The Journal of Urology, Dec. 2000, pp. 2134-2137, vol. 164.
Scarpelli et al. Karyometry Detects Subvisual Differences in Chromatin Organisation State . . . Low Malignant Potential, Journal of Clinical Pathology, Jan. 20, 2003, pp. 1-7.

* cited by examiner

*Primary Examiner*—Lori A Clow
(74) *Attorney, Agent, or Firm*—Quarles & Brady LLP; Gavin J. Milczarek-Desai

(57) ABSTRACT

A biological tissue sample is scanned to produce an image and corresponding optical-density data. A computerized algorithm is used to identify, segregate, and produce images of nuclei contained in the image. The OD values corresponding to nuclear chromatin are used to identify numerical patterns known to have statistical significance in relation to the health condition of the biological tissue. These patterns are analyzed through discriminant analysis and a non-supervised learning algorithm to predict changes that suggest a risk for the recurrence of a cancer event, such as a malignant lesion.

12 Claims, 8 Drawing Sheets

KARYOMETRY-BASED METHOD FOR PREDICTION OF CANCER EVENT RECURRENCE

BACKGROUND OF THE INVENTION

1. Field of the Invention

This invention is related in general to methods for analyzing biological samples. In particular, it relates to a method for a quantitative prediction of a cancer event recurrence based on karyometric assessment of nuclei from a tissue sample.

2. Description of the Related Art

Changes in the cellular structure of tissue are used to detect pathologic changes, to assess the progress of precancerous conditions, and to detect cancer. A tissue sample removed from a patient is typically sectioned and fixed to a slide for staining and microscopic examination by a pathologist. The morphology of the tissue (the visually perceptible structure and shape of components in the tissue) is analyzed to provide a qualitative assessment of its condition and to identify the presence of pathologic changes, such as may indicate progression towards a malignancy. For many decades, this visual procedure has been the diagnostic mainstay of pathology.

With the advent of computers and sophisticated digital imaging equipment, researchers have extended the realm of histopathology through the use of mechanized procedures for diagnostic and quantitative investigation. For example, U.S. Pat. No. 6,204,064 describes a method for measuring quantitatively the progression of a lesion toward malignancy by digitizing the images of clinical samples and analyzing nuclear chromatin texture features in the nuclei captured in the images. Numerical values are assigned to these features and compared to a monotonic progression curve previously established using the same criteria on known clinical samples ranging from normal to malignant tissue. Thus, the procedure provides a quantitative assessment of the condition of the tissue as well as a method for testing the efficacy of chemopreventive drugs or therapeutic treatments.

In such mechanized procedures, histopathologic sections and/or cytologic preparations are imaged with a microscope, and the images are digitized, stored, and analyzed for nuclear-placement patterns (histometry) or for the spatial and statistical distribution patterns of nuclear chromatin (karyometry). Karyometric assessment is always preceded by image segmentation, whereby each nucleus in an image is identified, outlined, isolated and stored as a separate image. As those skilled in the art readily understand, the nuclear chromatin pattern is an artifact of tissue fixation, but its spatial and statistical distributions are highly reproducible measures of the metabolic and functional state of cells. Thus, nuclear chromatin patterns have always been used in pathology to provide diagnostic clues. For example, the state of differentiation of the nucleus and its metabolic function may be reliably assessed based on a finding that nuclear chromatin is finely dispersed, coarsely aggregated, granular, clumped, or displaced toward the nuclear periphery.

Many chromatin texture features derived from the optical density of the tissue image have been identified as statistically significant for diagnostic purposes. Accordingly, after a sample is imaged and the image is digitized to provide an optical density value for each image pixel, the information is used in conventional manner first to identify and isolate each nucleus within the sample (image segmentation), and then to analyze chromatin patterns within each nucleus. The optical density recorded for each pixel is used to characterize chromatin features with statistical significance as characteristics for identifying changes in the condition of the tissue. These features are then used much as the statistics of alphabet letters can be used to identify features of a written text that are not readily perceptible by visual inspection. For example, the proportion of each letter appearing in a text, or the frequency of occurrence of certain letter digrams or trigrams, can be used to identify the language even though the text is not understood. Similarly, the spatial and statistical distribution of optical density in a nucleus can be used to detect chromatin patterns that are not visually perceptible. This notion has provided a useful vehicle for achieving advantageous refinements in the detection of pathological change and of precancerous and cancerous lesions.

Optical density (OD) of a sample is defined in the art as the logarithm of the ratio of the light incident to the sample and the light transmitted through it. As used in microscopic imagery, optical density is usually expressed in terms of base-ten logarithmic values that range between zero and about 1.80 (because the accuracy of measurement limits near-zero transmission readings). An OD value of zero refers to full transmission, while an OD of 1.80 refers to transmission slightly greater than 1 percent. OD values are conventionally grouped into intervals of 0.10 OD units. For convenience, OD values may be multiplied by a factor of 100, so that computations can be carried out with integers (for example, an OD value of 1.0 is represented by 100, which corresponds to 10% light transmission).

As mentioned above, many features may be defined from the statistical and spatial distribution of nuclear chromatin. Global features are computed from the nucleus as a whole. For example, "total optical density" is defined as the sum of all pixel OD values in the nuclear area (i.e., the number of pixels within the outline of a nucleus). This feature is known to be related to the DNA ploidy of the nucleus, a measure of genetic instability and a diagnostic clue for progression toward a pre-malignant or malignant lesion. The variance of optical density within a nucleus is another example of global feature. Other features are local in nature, such as the frequency of occurrence of particular OD values within a certain interval, and have been identified in the art as indicative of tissue condition.

According to related-art procedures, the chromatin features characterized using pixel OD values as described above have been reduced to number values representative of a quantitative measure of each feature and of a chromatin or nuclear "signature" representative of a set of features. These numeric values have then been used to provide pathologists with quantitative information available to complement their visual evaluation of tissue slides. For example, as generally described in U.S. Pat. No. 6,204,064, the information derived from the nuclear signature can be used advantageously as a quantitative measure of progression toward a lesion. That is, the physician is provided with information representative of a result formulated by the analytical algorithm built into the diagnostic system (e.g., a numerical value assigned to the nuclear signature calculated by the system and a resulting position on a progression curve).

While the related-art use of digitized karyometry techniques has been very useful in diagnosis and in charting progression from a preneoplastic to a malignant state, providing a quantitative prognosis for recurrence of a cancer event after a primary tumor has be treated or removed based on karyometric analysis only recently has been attempted. These analysis were performed by linear discriminant analysis and resulted in having a statistically significant difference between non-recurrent and recurrent cases of superficial transitional bladder carcinoma (see Van Velthoven et al., *The Journal of Urology*, Vol. 164, 2134-2137 [December 2000]).

However, the correct prediction rates for recurrence in all cases did not reach clinically useful levels. Also, in the past, a variety of immunohistochemical and molecular markers have been applied to predict disease occurrence and recurrence. However, results from studies utilizing these markers have been inconclusive at best.

Therefore, there is still a need for a mechanized diagnostic system that provides a measure of a chromatin feature(s) that is a statistically significant indicator of a cancer event recurrence (e.g., such an event might include the recurrence of a pre-malignant or malignant lesion). Such a method would enable a pathologist to consider karyometric features that are not visually detectable yet correlate with future cancer-related disease events, thus allowing a prediction of whether recurrence of a specific disease event can be expected. Accordingly, monitoring, chemoprevention and intervention can be appropriately gauged and implemented.

At this time, there are over 10 million cancer survivors in the United States alone. A substantial proportion of these survivors must expect a recurrence of their primary tumor within a few year's time. A method allowing the identification of those patients for whom recurrence is likely would be an invaluable medical tool in efforts to increase the quality and longevity of cancer survivor's lives.

BRIEF SUMMARY OF THE INVENTION

The invention relates to a method for quantitatively measuring the prognosis for a cancer event recurrence in a tissue sample. More particularly, the invention involves imaging nuclei from a plurality of tissue samples from known recurrent and non-recurrent tumor cases to produce corresponding optical-density data for each case; performing a first discriminant analysis of the optical-density data associated with the cases in order to identify a first set of cases suitable for classification as either recurrent or non-recurrent with a first predetermined degree of certainty based on a first discriminant chromatin feature, thereby also identifying a second set of cases that are not suitable for classification within said first predetermined degree of certainty based on said first discriminant chromatin feature; performing a second discriminant analysis of optical-density data associated with the second set of cases in order to identify a subset of cases suitable for classification as either recurrent or non-recurrent with a second predetermined degree of certainty based on a second discriminant chromatin feature; segregating subpopulations of nuclei from the subset of cases using a non-supervised learning algorithm applied to the second discriminant chromatin feature; analyzing the subpopulations of nuclei to produce a statistically significant indicator of said tumor recurrence based on the second discriminant chromatin feature; imaging a test tissue sample from a patient to produce test optical-density data corresponding thereto; obtaining a value of the statistically significant indicator from the test optical-density data corresponding to the test tissue sample; and providing a prognosis for a tumor recurrence in the patient based on the value of the statistically significant indicator.

Thus, according to an aspect of the present invention, a biological tissue sample is scanned to produce an image of the sample and corresponding optical-density data for each pixel in the image. These data are analyzed using a computerized algorithm to identify, isolate and produce images of nuclei contained in the image of the sample. The OD values corresponding to nuclear chromatin are used to generate and identify numerical patterns known to have statistical significance in relation to the health condition of the biological tissue being tested. These patterns are analyzed to detect, for example, chromatin features that suggest a risk for the recurrence of a cancer event, such as a pre-malignant or malignant lesion. Thus, these or other numerically derived patterns may be used to quantify a property of the sample that in turn provides a quantitative prognostic result associated with that property.

In another aspect of the invention, a kit is provided that includes an apparatus for collecting a sample of cells (e.g., a scraper, brush, or biopsy needle), means for storing the cell sample in a medium suitable for karyometric analysis, and instructions for submitting the sample to a facility for quantitative measurement of the prognosis for a cancer event recurrence.

Various other purposes and advantages of the invention will become clear from its description in the specification that follows and from the novel features particularly pointed out in the appended claims. Therefore, to the accomplishment of the objectives described above, this invention consists of the features and algorithmic procedures hereinafter illustrated in the drawings, fully described in the detailed description of the preferred embodiment and particularly pointed out in the claims. However, such drawings and description disclose but one of the various ways in which the invention may be practiced.

DESCRIPTION OF THE PREFERRED EMBODIMENTS OF THE INVENTION

Figure 1:
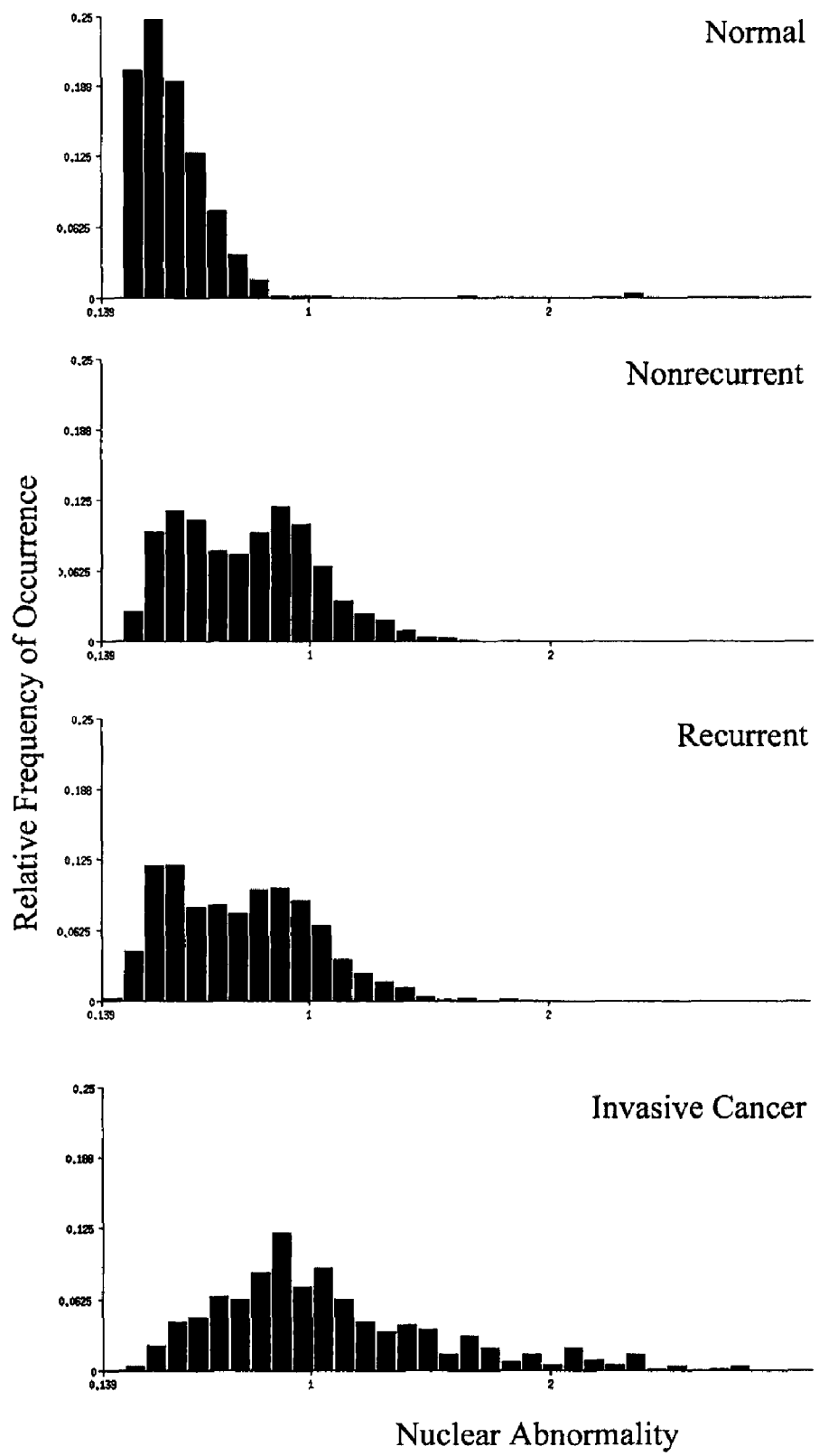
FIG. 1 depicts OD-related lesion signatures for normal, non-recurrent, recurrent, and invasive cancer cases.
Figure 2:
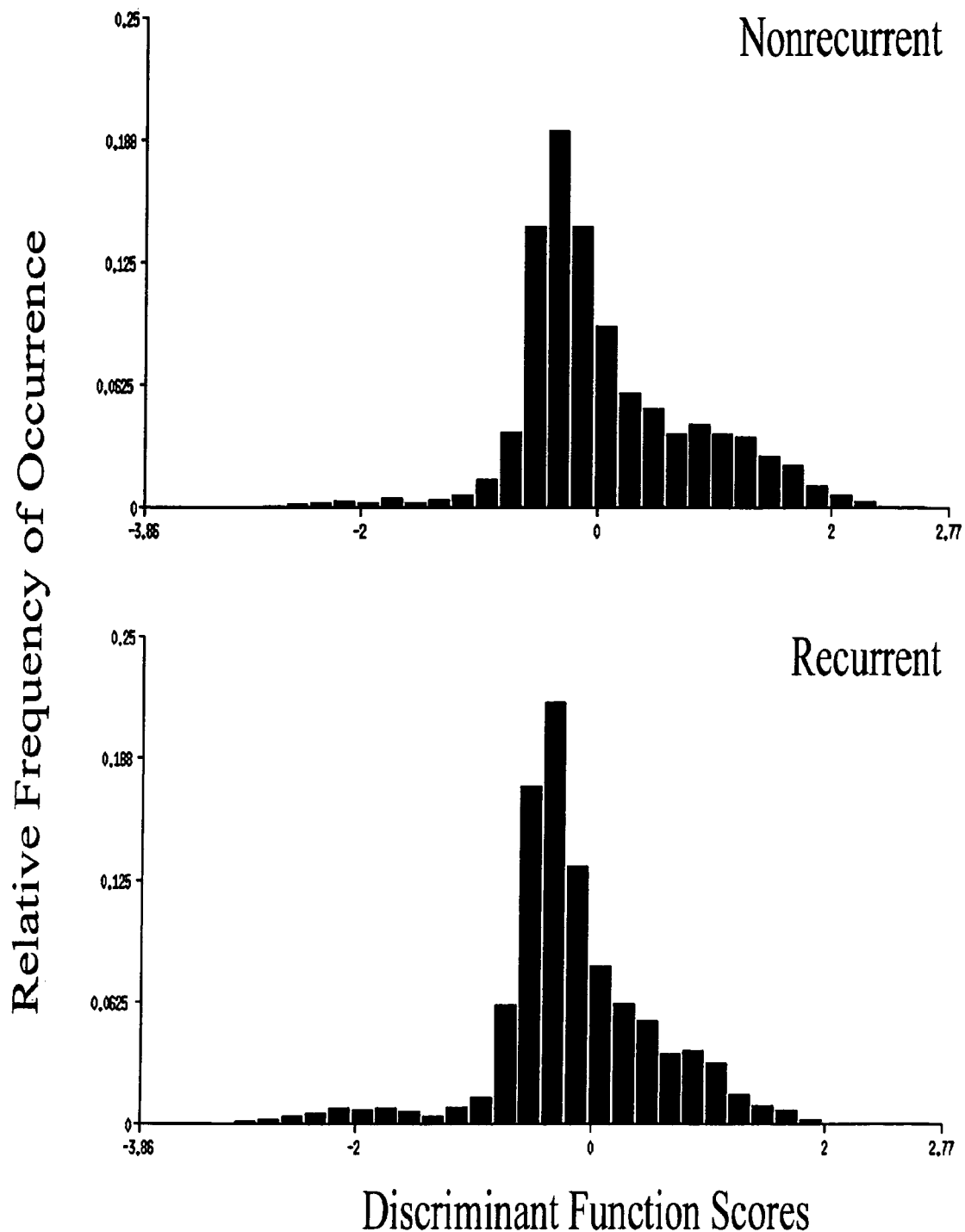
FIG. 2 depicts first order discriminant function score distributions (DF I,1) for the nonrecurring and recurrent cases shown in FIG. 1.

The invention involves a method for utilizing statistical analysis of chromatin features in the prognostic assessment of a cancer event, which, for example, may include a measure of the risk that a lesion will recur. This is in contrast to related-art procedures that utilize digital karyometric analysis to establish a diagnosis or the degree of progression on a progression curve. Indeed, related-art methods provide only what might be termed a "snap-shot" of the present state of a cell's nuclear chromatin, while providing no information regarding whether a lesion is likely to recur. That prognostic information is provided by the method of the present invention.

As used herein, the term "pixel" refers both to the discrete portion of a light detector associated with a signal corresponding to light received thereby and to the corresponding area of the sample from which the light is received.

In a preferred embodiment of the invention, the method to establish the risk for the recurrence of a premalignant or malignant lesion involves three stages. In the first stage, biopsy or cytological samples are collected from two groups of patients. One group of patients is selected who had no recurrence of disease (NR) during a sufficiently long follow-up period. The other group of patients is formed from patients who did have a recurrent primary lesion (R). This collection of a database could also take the form of a prospective study, but more typically it would rely on archival material in a retrospective study.

The clinical materials (e.g., skin, endometrial, prostate, esophagus, breast, bladder, or colon tissue) would be prepared for microphotometric assessment by fixation according to a consistent protocol; for example, fixation in 4% neutral buffered formaldehyde for 24 hours. In the case of tissue biopsies, the material would be embedded in paraffin and sectioned to a suitable thickness, e.g. 5 microns. Next, the material would be stained by a dye (e.g., haematoxylin and eosin [H&E]) or subjected to a cytochemical reaction under controlled conditions. The slides would then be coverslipped and submitted for recording on a microphotometer.

Representative regions in each biopsy would be identified and outlined by a histopathologist. These regions are then digitized under high resolution, typically under an oil immersion objective (e.g., 63:1 Zeiss planapochromatic oil immersion objective, NA 1.40) and video recorded as previously described in U.S. Pat. No. 6,204,064. The image sampling typically would be 4-6 pixels per linear micron. As a next step the nuclei would be segmented and the nuclear images stored for analysis.

Typically, data would be recorded from 80-200 cases for a given type of lesion to establish a database. Of these cases, half would be from the non-recurrent group and half from the recurrent group. For each case, a minimum of 100 nuclei would be recorded for lesions for which prior measurements had established that the nuclei in the lesion form a homogeneous set. For material from lesions for which no previous data are available, it is advisable to record up to 400 nuclei so that, if a discrimination has to be based on certain subpopulations of nuclei of different phenotype, one already has a sufficient number of nuclei recorded to provide a representative data set. For each nucleus, a set of about 100 texture features, or attributes, descriptive of the spatial and statistical distribution of the nuclear chromatin is computed and stored in a feature file. This completes the first stage of the procedure.

The second stage of the procedure involves data analysis and development of a decision process for risk assessment. From the data groups above with either non-recurrence or recurrence, typically ⅔ of the cases are randomly selected from each group. One third is reserved to form a test data set. The two training data sets are then submitted to a feature preselection process to reduce the number of features, also termed the "dimensionality," that will be examined subsequently. This preselection process typically involves selecting only those features for which the two training sets have statistically highly significant differences. The reduced feature set is then submitted to a classification algorithm, which typically will further reduce the number of features that are retained for the purpose of defining a classification rule. For these features, the algorithm will assign weights and the algorithm will define a classification rule. This results in a numeric classification score for each nucleus and in a percentage of nuclei correctly classified by that rule. One also obtains the mean classification score for each case, averaged over all its nuclei.

The classification rule then is applied to the nuclei from the test sets to establish that it is generally valid and not applicable for only the training set data. This requires that, in the formation of the training sets and test sets, the two sets are formed from different cases and not by a random selection of nuclei from all cases. In this validation on an independent test data set one may expect to have a slightly reduced classification success.

Under ideal circumstances, the difference in the nuclear chromatin patterns is so distinctive that the vast majority of nuclei are correctly assigned, either to the NR or the R data sets. Then, the mean classification score for each case may allow an unequivocal case classification, and one can define a statistical criterion—such as the distance and direction from the multivariate data set of the non-recurrent cases—to derive a numeric measure of risk.

However, in real world data, the differences in nuclear chromatin pattern between cases with no recurrence (i.e., at very low risk) and cases that had a recurrence (i.e., at high risk and involving the need for frequent monitoring) are usually very subtle such that one can expect only a moderately correct case classification rate and an assignment to a group to be monitored based possibly on an uncertain risk assessment.

One reason for finding only a very modest difference between the nuclei in the NR and in the R group is that nuclei in these lesions rarely constitute a homogeneous set. Rather, they comprise nuclei from a number of different phenotypes with different chromatin patterns. Often, the differences which identify lesions as having high likelihood of recurrence are expressed only in one of those phenotypes. When analyzed as part of the entire data set, the small differences are further "diluted" and insufficient to identify a case.

Under those circumstances the following processing strategy is helpful. The data for the NR and the R cases are each separately submitted to a non-supervised learning algorithm. As a feature set, one may use the same feature set selected by the discrimination algorithm, or one may also try different feature sets. It also is helpful to inspect the distribution of discriminant function scores for the NR and the R nuclei. One may then form subsets of data formed from only those nuclei which had extreme discriminant function scores (these are the nuclei which express any existing difference best), and one may use these subsets for a feature selection for the non-supervised learning process.

A non-supervised learning algorithm will form subsets or subpopulations of nuclei that are similar to each other and different from other subsets. Such subsets are often referred to as "clusters." The algorithm will do this automatically, i.e., it will discover such a cluster structure on an objective basis without input from the analyst. Thus, for example, if instructed to form four subsets, the algorithm will try to do this. However, whether the finding of four subsets has any significance depends on whether the nuclei in these subsets are statistically different from each other. In other words, the existence of subsets is accepted only if they can be shown to be statistically different from each other. In the situation described here, the clusters formed for the NR and the R data sets usually correspond to each other but, one may well find one or two corresponding pairs separated for the NR and the R data. For these clusters, the mean feature vectors for the nuclei from each case are computed and stored. Not all cases may have nuclei assigned to each cluster.

Next, the case mean feature vectors from the selected corresponding clusters of the NR and the R data sets are submitted to the non-supervised learning algorithm, which is asked to form two clusters. The NR mean vector over all case mean values and its covariance matrix are saved, and the same is done for the R mean vector and covariance matrix. These values are saved and submitted later as entries into a maximum likelihood classifier.

The third stage of the procedure is a processing sequence for an unknown, new case. The above saved statistics (i.e., the NR and R group mean values and covariance matrices) are needed when a new unknown case is to be classified because the processing follows the same sequence as outlined above. For the selected feature set, the nuclei from a new, unknown case are submitted to the unsupervised learning algorithm, and the nuclei assigned to the identified cluster are saved and their mean vector is computed.

Next, this mean vector is submitted to the maximum likelihood classifier based on the two distributions of case mean values for the selected clusters from the NR and the R data sets. The classifier will assign the unknown case to either the NR or the R data set, and it will provide a numeric value for a statistic representing the risk for recurrence.

Many pixel OD-based features have been used in the art to identify useful patterns for diagnostic applications. For example, other first-order statistical variables may consist of how often consecutive OD values in a line of pixels fall within a certain interval. Higher-order statistical variables may similarly be used, such as the slopes of OD values between adjacent pixels. Finally, additional specific features have been utilized to summarize statistical properties, such as run-length uniformity or non-uniformity, OD lumpiness, shape of the OD histogram, and other descriptive features. These features have been used in the art in various manners in order to produce a nuclear signature which, when compared to the nuclear signature of a normal tissue, provides a quantitative assessment of the condition of the tissue. See, for example, P. H. Bartels et al., "Extraction and evaluation of information from digitized cell images," in *Mammalian cells: probes and problems*, Richmond et al. ed., Oak Ridge, Tenn., Technical Information Center, 1975:15-28; T. Young et al., "Characterization of chromatin distributions in cell nuclei," Cytometry 1986, 7:467-474; E. Bengtsson et al., "Densitometry, Morphometry and Texture Analysis as Tools in Quantitative Cytometry and Automated Cancer Screening," Grohs and Husain OAN, editors, 1994. p. 21-43; and A. Doudkine et al., "Nuclear texture measurements in image cytometry," Pathologica 1995, 87:286-299.

The invention is best illustrated by the following non-limiting example.

A preceding exploratory study had shown that a karyometric assessment of nuclei from papillary urothelial neoplasms of low malignant potential revealed subtle differences in phenotype which correlated with recurrence of disease. That study had involved only 20 subjects, ten with recurrence and ten without recurrence during the trial period. The analysis had shown that a classification based on the nuclear chromatin pattern assigned 8/10 of the recurrent cases, and 10/10 of the non-recurrent cases correctly. The exploratory study's sample size was too small to run an independent test set, but feature selection had been done with a generous Bonferroni correction (p<0.005). It is the objective of this example to validate the results from the exploratory study on a larger sample size.

Material and Methods

The clinical materials all came from the tissue archives of the Section of Pathologic Anatomy and Histopathology, Polytechnic University of the Marche Region, Ancona, Italy. Patient selection criteria were described in a previous publication (*J. Clin. Pathol.*, November 2004; 57: 1201-1207.). There were 40 patients in the recurrent group (R), and 45 patients in the non-recurrent group (NR). All samples had been fixed in 4 % neutral buffered formaldehyde for 24 hours, embedded in paraffin, sectioned to 5 microns, and stained under controlled conditions by H & E.

Data analysis in the exploratory study above had led to a hierarchic classifier. The same approach was used for the cases recorded here.

The first classification stage was based on a first order linear discriminant function (DF I,1) to discriminate between nuclei from the non-recurrent and from the recurrent cases. The distribution of discriminant function scores had shown considerable overlap. However, if one chooses, as a metafeature, a certain percentage of nuclei with high discriminant function scores, a substantial percentage of non-recurrent cases could be classified without error. This "rule 1" was retained for the validation study, with the same threshold in the discriminant function score distribution and the same percentage of nuclei expected beyond that threshold.

For the remainder of cases—the great majority of the recurrent cases and the as yet unclassified non-recurrent cases—a second first order discriminant function (DF I,2) had been derived. In the exploratory study, the case mean scores for the functions DFI,1 and DF I,2 had been submitted to a box classifier (Bartels, P. et al., *Methods of Cell Separation*, Vol. 3, New York: Plenum Press, 1980: 1-99) which resulted in a correct classification of all NR cases, and of 9/10 of the R cases.

However, the performance of a box classifier on samples of small size can result in too optimistic an estimate. To derive an estimate of a correct classification rate on a more conservative basis, the data from the exploratory study was submitted to the non-supervised learning algorithm P-index. Its classification, based on a Bayesian criterion, has resulted in an 85 % correct classification rate. The current validation study followed the above described analytic approach. However, the larger sample size allowed a more detailed analytic assessment.

Validation was pursued by a number of separate approaches. First, the exact procedure from the exploratory study was applied to the large validation set. Second, since the DF I,2 function of the exploratory study had been based on a small sample size, a new discriminant function was derived. Next, the validation data set was divided into training and test sets with ⅔ of the cases assigned to the training sets, and ⅓ to the test sets, on a rotating basis, and validation of the classification rate was thus tested on three separate data sets by a leave-one-out process. Finally, the larger sample size allowed a different use of non-supervised learning.

Results

In the enlarged data set of 85 cases, the differences between the NR and the R cases were again found to be very small. The lesion signatures provide clear evidence that the nuclei sampled from the papillary neoplastic lesions in both the non-recurrent and in the recurrent cases deviate significantly from nuclei from normal urothelium. They also deviate from nuclei from invasive lesions, as seen in FIG. 1. However, the lesion signatures of the non-recurrent and of the recurrent cases are very similar.

Table I shows the average nuclear abnormality values, which differ notably from normal and from values seen in invasive cancer, but the values are virtually identical for the R and the NR cases.

TABLE I

Average nuclear abnormality

| | |
|---|---|
| normal urothelium | 0.432 |
| non-recurrent papillary neoplasm | 0.739 |
| recurrent papillary neoplasm | 0.726 |
| invasive cancer | 1.074 |

There are a number of features that show a monotonic rise from normal, to papillary neoplasm, to invasive cancer, as seen in Table II.

TABLE II

Features with monotonically rising values

| | normal | NR | R | invasive cancer | |
|---|---|---|---|---|---|
| 001 | 0.21 | 0.245 | 0.26 | 0.502 | (Total Pixel O.D.) |
| 002 | 13.6 | 20.6 | 20.4 | 32.4 | (Nuclear Area) |
| 275 | 5.6 | 6.6 | 9.0 | 18.1 | (Run Length Texture Feature) |
| 307 | 219.6 | 327.6 | 383.3 | 604.5 | (Percentage of Pixels Occurring in a Run) |

In the preceding study, the discriminant function DFI,1 was based on six features descriptive of nuclear chromatin texture. This function was applied directly to the new data. The score distributions for the NR and the R cases looked virtually the same as those obtained earlier. The cases in the pilot study thus were representative. The scores for non-recurring cases again extend farther into the high score range.

Figure 3:
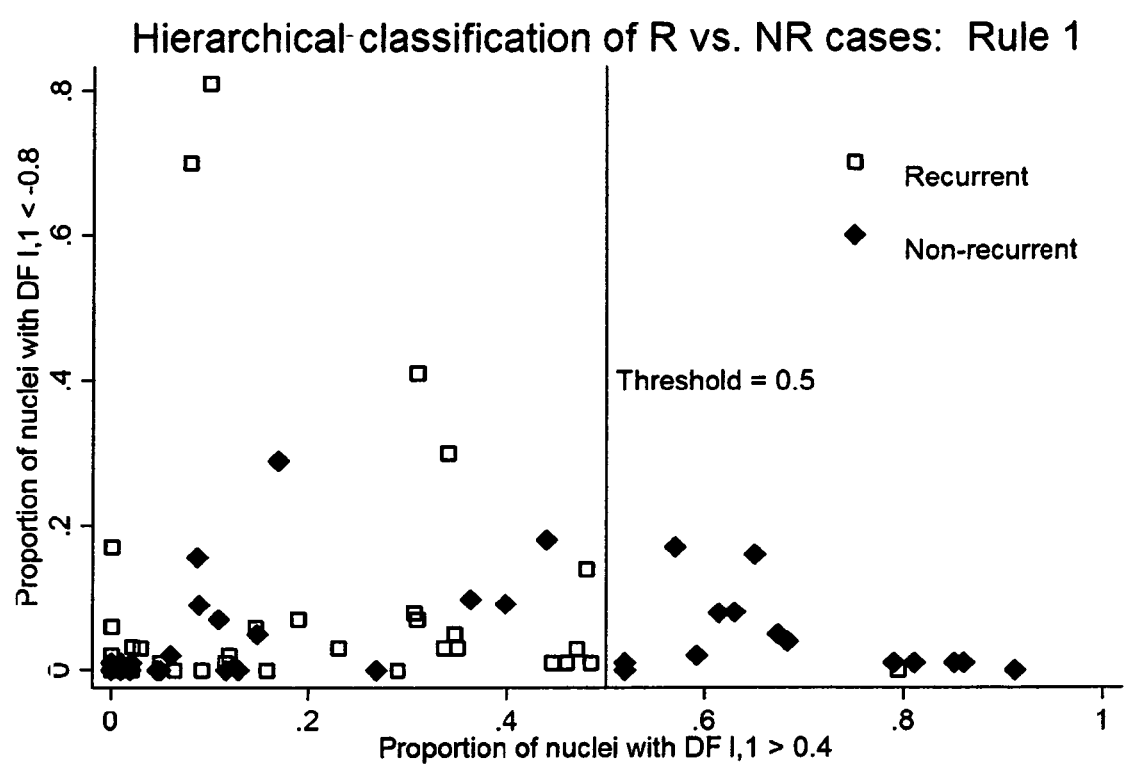
FIG. 3 is an illustration of "rule 1" in the full data set, whereby cases with the proportion of nuclei having more than 50% of nuclei with DF I,1>0.4 are classified as nonrecurrent.

FIG. 3 shows the plot resulting from applying "rule 1" from the pilot study to the large data set. On the left side of the threshold in this plot one finds extensive overlap for cases from both the R and the NR groups. For these cases, the pilot study had derived discriminant function DF I,2 as the second stage in the hierarchic classifier. This had resulted in a classification of 10/10 of the NR cases, and 8/10 of the R cases.

However, this function was based on only 3 and 4 cases respectively from the NR and R groups. When applied directly to the enlarged data set in the validation study, the correct recognition was only about 60%, inadequate for clinical purposes.

Figure 4:
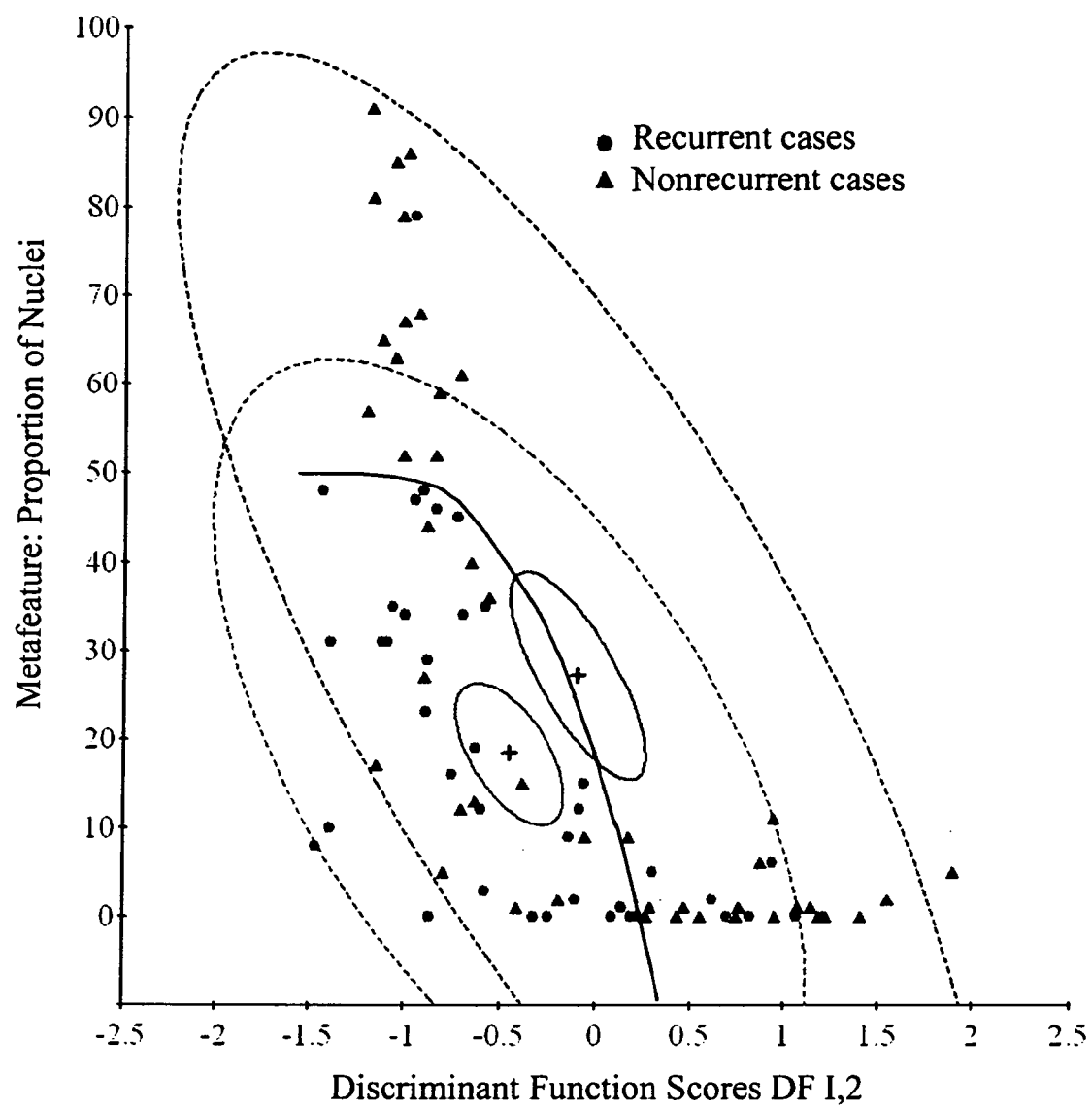
FIG. 4 illustrates the proportion of nuclei per case above a fixed threshold vs. scores from a second first order discriminant function, DF I,2, with a non-linear classification boundary.

A new discriminant function derived from all the cases left after the application of rule 1, combined with the metafeature based on the percentage of nuclei above a certain threshold on the DF I,1 score axis, leads to the plot shown in FIG. 4. There is a correct recognition rate of 82 % of the NR cases, and of 73% of the R cases, based on the non-linear decision boundary seen in FIG. 4.

Figure 5:
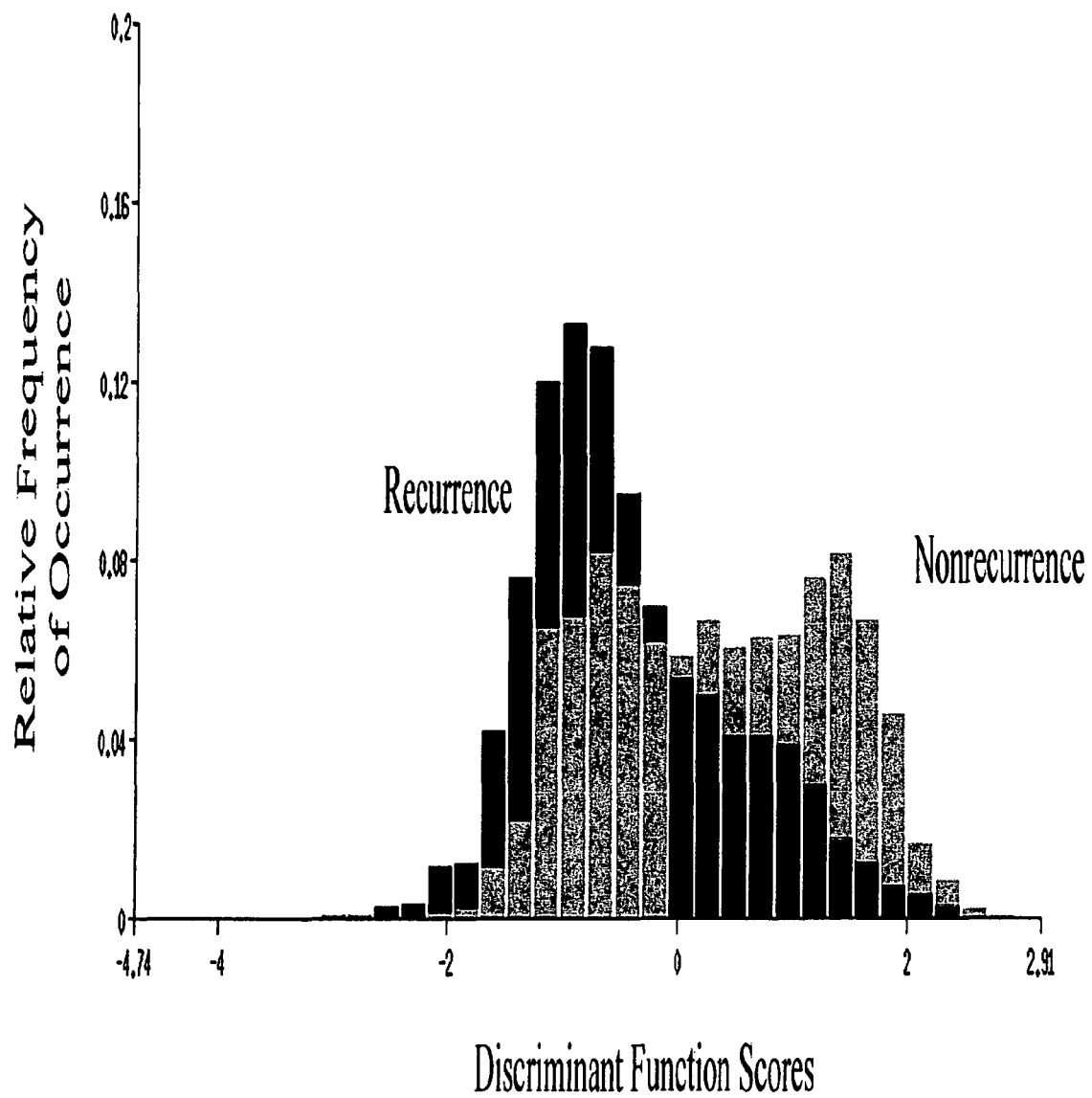
FIG. 5 depicts distributions of DF I,2 for recurrent and non-recurrent cases. Bins in which the two distributions differ markedly are candidates for the development of a second-order discriminant function.

For the 70 cases left after application of "rule 1," a discriminant function was derived. The score distribution shows a marked shift, as seen in FIG. 5, and a second order discriminant analysis appeared promising.

A KW test offered eight features with a p-value <0.005. The second order discriminant algorithm reduced Wilks Lambda to 0.799. The two distributions of case mean values for the NR and the R data sets are statistically different at a high level of significance. Table 3 shows the case classification matrix for an average correct classification of 72 %. This is a gain over the first order discriminant analysis, but not a marked gain.

TABLE 3

Classification by DF II, 1

| | NR | R |
|---|---|---|
| NR | 61% | 39% |
| R | 26% | 74% |

However, processing by the non-supervised learning algorithm P-index made it evident that the nuclei from the NR group and the R group have statistically significantly different chromatin patterns. The discriminant scores and the bivariate confidence ellipses of the clusters seen in FIG. 7 demonstrate this.

At this point it was decided to attempt a better case classification on the basis of differences in the phenotypical composition of the data sets, if such homogeneity could be found. Such an approach had been successful in similar situations before.

There were 85 cases to start with, and, after application of "rule 1," there were 70 cases left, 39 from the recurrent group, and 31 from the non-recurrent group. The features from the discriminant function DF I,2 were used, in a first attempt, to explore the phenotypical heterogeneity of the nuclei from these lesions.

Figure 6:
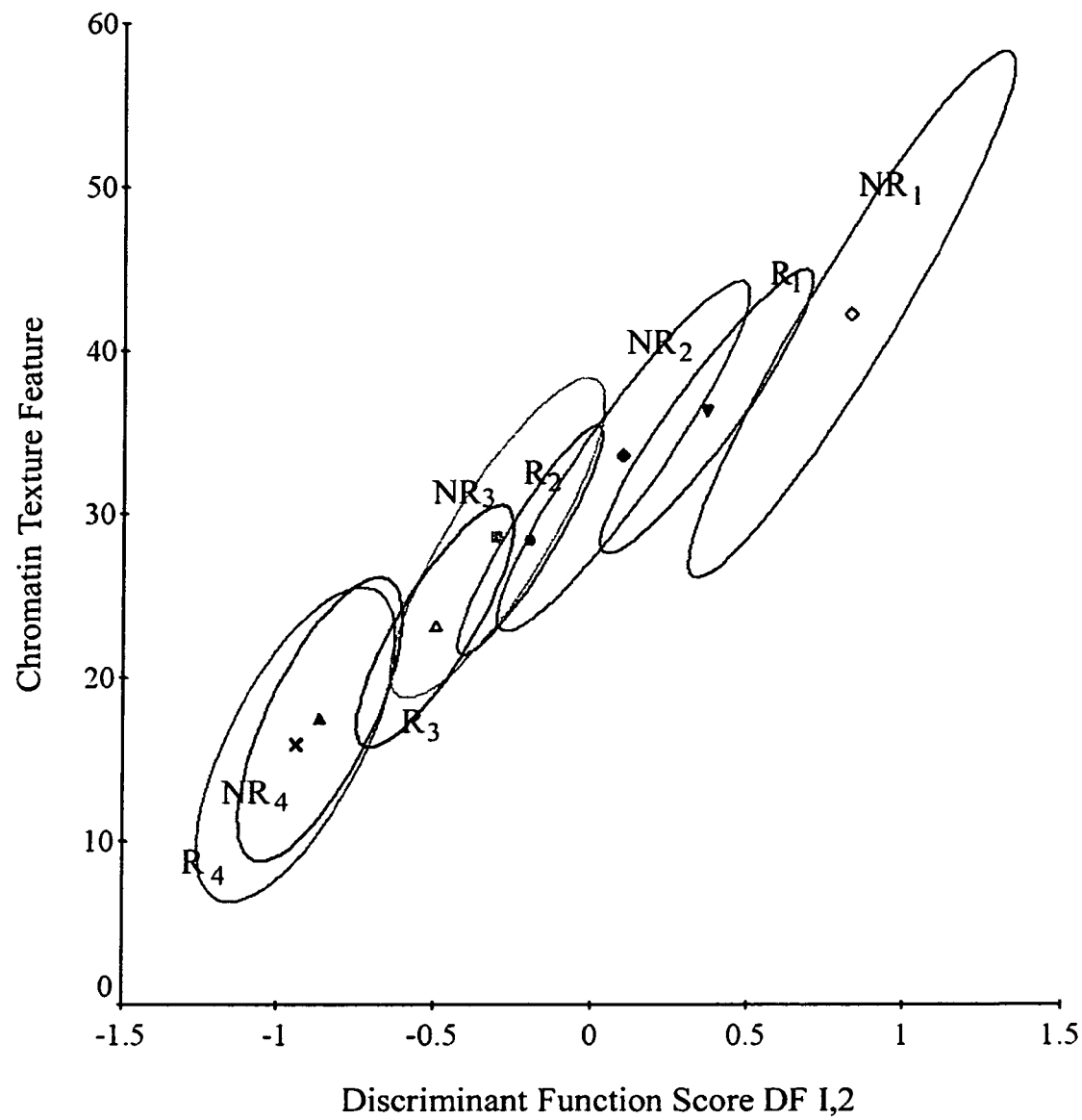
FIG. 6 illustrates the distribution of a chromatin texture feature vs. discriminant function score DF I,2, showing four phenotypes each for recurrent and non-recurrent cases.

Two separate P-index runs were performed, for the NR and the R data sets. In each data set the nuclei were found distributed into four statistically significantly different phenotypes. These phenotypes closely correspond to each other in the NR and the R data sets. For the two corresponding phenotypes at the one extreme, with discriminant function scores indicating the highest deviations from normal, the confidence ellipses overlap completely and are not statistically different between the NR and the R data sets. For the two corresponding phenotypes appearing at the other extreme range of the feature values, there is an increasing separation of the distributions for the NR and the R data sets. Thus, a classification of cases based on nuclei assignment to these two phenotypes appeared possible. Several combinations of features were used to confirm this data structure. FIG. 6 shows one example where the discriminant function score was used as abscissa.

Examining only the two corresponding clusters at the high range of the discriminant function score range, 28/39 cases of the R group could be correctly classified, with two errors. Of the NR group, 23/31 cases were correctly classified, with one error. This step in the hierarchic classification sequence is referred to as "rule 2." After eliminating these correctly classified cases, and examining the next corresponding cluster pair, nine more cases of the R group and 4 of the NR group could be correctly assigned, by "rule 3." The final accounting for the hierarchic decision sequence of "rule 1" and then "rules 2 and 3" then came to:

40 R cases: 37 correct, 3 wrong; and
45 NR cases: 41 correct, 1 wrong, 3 not assigned.

Thus, for 85 cases total, 78/85 correct=91.7% correct; with 91.1% correct classifications for the NR data set and 92.5% correct classification for the R data set. These were the result when the entire data set was employed as a test set.

Figure 7:
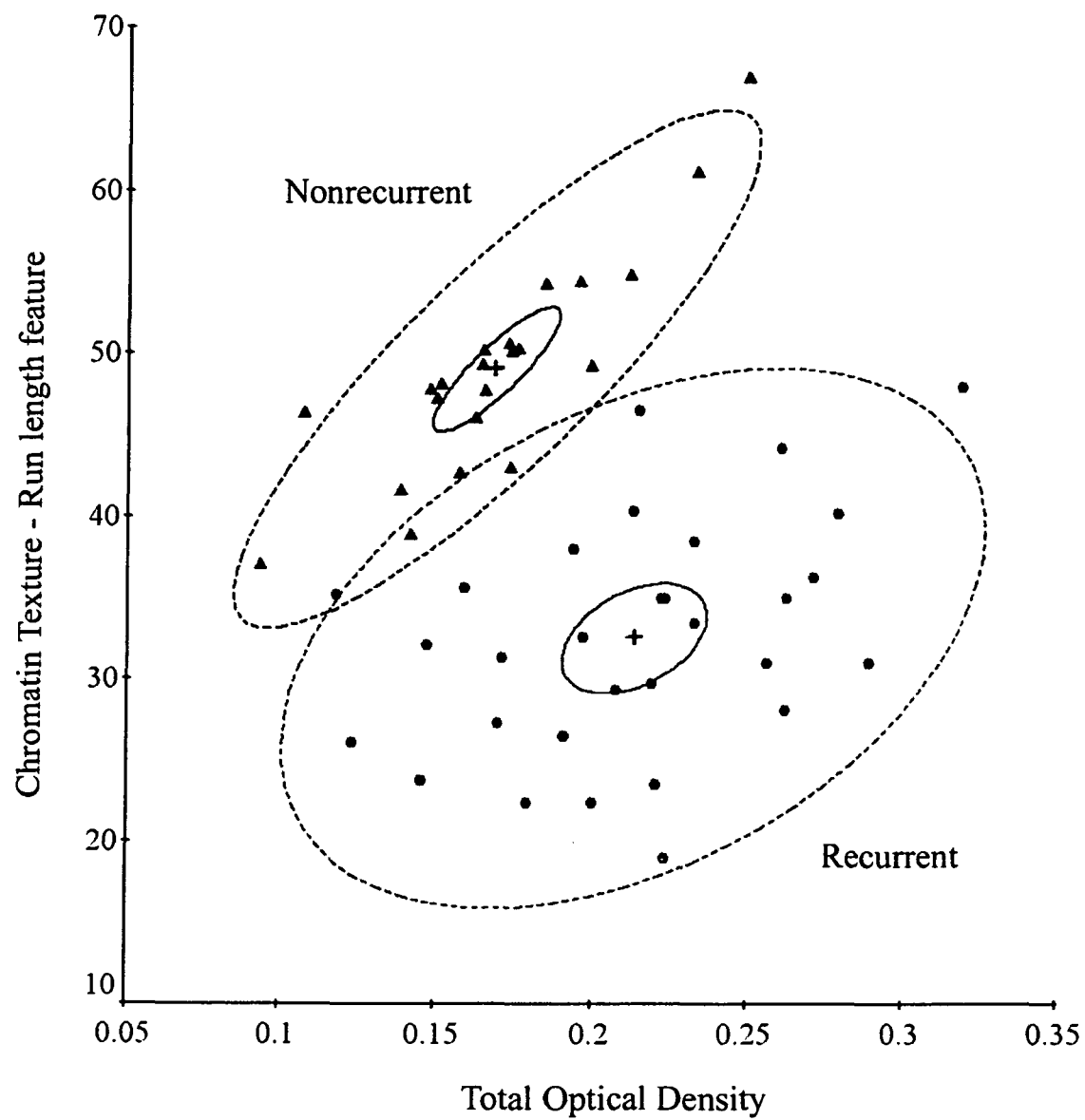
FIG. 7 depicts a plot of a run length feature vs. total optical density, showing the degree of separation between recurrent and non-recurrent cases for one of the four phenotypes depicted in FIG. 6.

The separation of NR and R cases into two sets of corresponding clusters can be shown for several different sets of features. FIG. 7 shows the separation for a feature set consisting of the two features total optical density and a run length feature. Serving as "rule 2," it would provide a correct classification of 29/30 of the submitted R cases, and 22/22 cases of the NR data set, with only a single recurrent case misclassified.

As a next step in the validation processing, the general validity of the classification success, rather than of a given sequence of classification rules, was tested. This was done by dividing the entire data set into three subsets, each formed from ⅔ of cases as a training set, and ⅓ of cases as test set, and rotated three times. This process would test the performance of independently derived classification rules, and the general validity of each set in the three training set/test set processing sequences. The following processing sequence was applied. The training set data were used to derive a DF I,1 function. This function was thresholded, and cases with a certain percentage of nuclei with high function scores were identified and removed from further consideration, as "rule 1."

Figure 8:
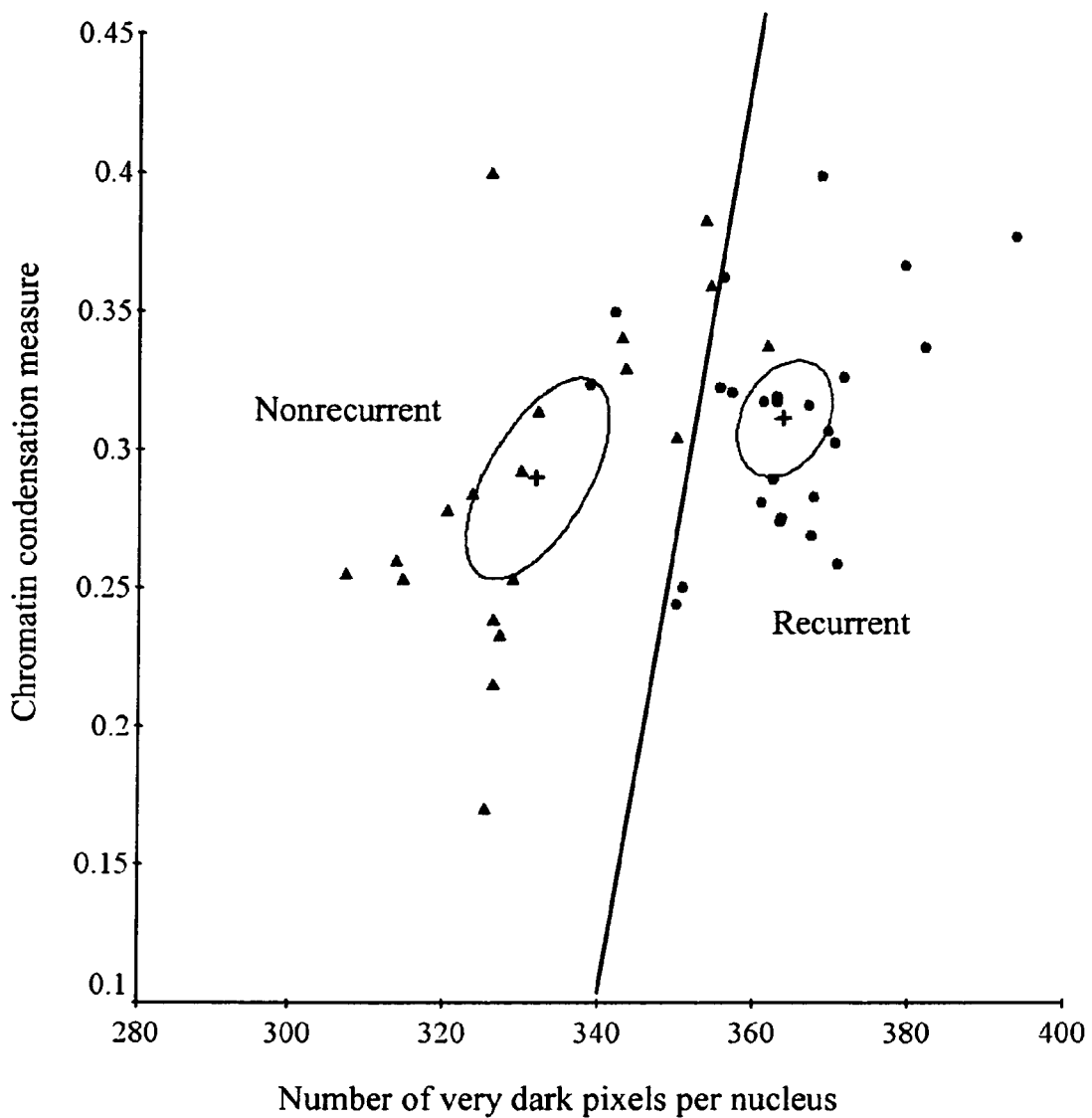
FIG. 8 depicts a plot of chromatin condensation vs. number of very dark pixels per for recurrent and non-recurrent cases for one of the four phenotypes depicted in FIG. 6.

On the remaining cases, a KW test was done, and a discriminant function DF I,2 was derived. The features selected by this function were used to run the non-supervised learning algorithm P-index, which was set to form up to four groups. For each of the phenotype subgroups thus formed, the feature mean values of the assigned nuclei were computed and projected into a display formed by two axes, such as the score values of the discriminant function DF I,2, and one or two of the chromatin texture features. For the best separated phenotype subgroups of the R and NR data sets, a linear classification boundary was established as "rule 2." FIG. 8 shows an example for one of the three validation sets; here, two chromatin texture features had been chosen to define a "rule 2."

The exact same processing sequence was then applied to the test set. This validation processing was repeated for the three training sets and their test sets. However, in each of these three processes, an independent feature selection for the DF I,1 and DF I,2 function was carried out, and a different "rule 2" was employed. For the three validation sets, the following results were obtained:

|  | R |  | NR |  |
|---|---|---|---|---|
| Training set 1 |  |  |  |  |
| correct | 23/27 | 85.2% | 28/29 | 96.6% |
| overall correct |  | 91.1% |  |  |
| Test set 1 |  |  |  |  |
| correct | 9/13 | 69.2% | 16/16 | 100% |
| overall correct |  | 86.2% |  |  |
| Training set 2 |  |  |  |  |
| correct | 23/27 | 85.2% | 29/30 | 96.7% |
| overall correct |  | 91.2% |  |  |
| Test set 2 |  |  |  |  |
| correct | 7/13 | 53.8% | 15/15 | 100% |
| overall correct |  | 78.6% |  |  |
| Training set 3 |  |  |  |  |
| correct | 24/25 | 96.0% | 29/30 | 96.7% |
| overall correct |  | 96.3% |  |  |
| Test set 3 |  |  |  |  |
| correct | 13/13 | 100% | 12/15 | 80.0% |
| overall correct |  | 89.2% |  |  |

Various other changes in the details, steps and components that have been described may be made by those skilled in the art within the principles and scope of the invention herein illustrated and defined in the appended claims. Therefore, while the present invention has been shown and described herein in what is believed to be the most practical and preferred embodiments, it is recognized that departures can be made therefrom within the scope of the invention, which is not to be limited to the details disclosed herein but is to be accorded the full scope of the claims so as to embrace any and all equivalent processes and products.

We claim:

1. A method for quantitatively measuring a prognosis for a tumor recurrence, comprising the steps of:
    (a) imaging nuclei from a plurality of tissue samples from known recurrent and non-recurrent tumor cases to produce corresponding optical-density data for each case;
    (b) performing a first discriminant analysis of said optical-density data associated with said cases in order to identify a first set of cases suitable for classification as either recurrent or non-recurrent with a first predetermined degree of certainty based on a first discriminant chromatin feature, thereby also identifying a second set of cases from said known recurrent and non-recurrent tumor cases in step (a) that are not suitable for classification within said first predetermined degree of certainty based on said first discriminant chromatin feature;
    (c) performing a second discriminant analysis of optical-density data associated with said second set of cases in order to identify a subset of cases suitable for classification as either recurrent or non-recurrent with a second predetermined degree of certainty based on a second discriminant chromatin feature;
    (d) segregating subpopulations of nuclei from said subset of cases using a non-supervised learning algorithm applied to said second discriminant chromatin feature;
    (e) analyzing said subpopulations of nuclei to produce a statistically significant indicator of said tumor recurrence based on said second discriminant chromatin feature;
    (f) imaging a test tissue sample from a patient to produce test optical-density data corresponding thereto;
    (g) obtaining a value of said statistically significant indicator from said test optical-density data corresponding to the test tissue sample; and
    (h) providing a prognosis for a tumor recurrence in said patient based on said value of the statistically significant indicator.

2. The method of claim 1, wherein said first or said second degree of certainty is 90% or greater.

3. The method of claim 2, wherein steps (c) and (d) involve discriminant analysis of more than one chromatin feature.

4. The method of claim 1, wherein the first discriminant analysis of step (b) includes using a first order discriminant function.

5. The method of claim 1, wherein the second discriminant analysis of step (c) includes using a second discriminant function.

6. The method of claim 1, wherein steps (c) and (d) are repeated for one or more additional chromatin features.

7. The method of claim 1, further including the step of indexing a monitoring or therapeutic intervention strategy in accordance with said prognosis for tumor recurrence.

8. The method of claim 1, wherein said tissue samples are selected from the tissue group consisting of skin, endometrial, prostate, esophagus, breast, bladder, and colon.

9. The method of claim 1, wherein said tumor recurrence is a pre-malignant lesion.

10. The method of claim 1, wherein said tumor recurrence is a malignant lesion.

11. The method of claim 1, wherein step (e) includes selecting those subpopulations for which nuclei from recurrent and nonrecurrent cases are well segregated and establishing a classification rule for corresponding recurrent and nonrecurrent cases.

12. A method for creating a database of chromatin features indicating a statistically significant probability for tumor recurrence, comprising the steps of:
(a) imaging nuclei from a plurality of tissue samples from known recurrent and non-recurrent tumor cases to produce corresponding optical-density data for each case;
(b) performing a first discriminant analysis of said optical-density data associated with said cases in order to identify a first set of cases suitable for classification as either recurrent or non-recurrent with a first predetermined degree of certainty based on a first discriminant chromatin feature, thereby also identifying a second set of cases from said known recurrent and non-recurrent tumor cases in step (a) that are not suitable for classification within said first predetermined degree of certainty based on said first discriminant chromatin feature;
(c) performing a second discriminant analysis of optical-density data associated with said second set of cases in order to identify a subset of cases suitable for classification as either recurrent or non-recurrent with a second predetermined degree of certainty based on a second discriminant chromatin feature;
(d) segregating subpopulations of nuclei from said subset of cases using a non-supervised learning algorithm applied to said second discriminant chromatin feature; and
(e) analyzing said subpopulations of nuclei to produce a statistically significant indicator of said tumor recurrence based on said second discriminant chromatin feature.

* * * * *